United States Patent
Abraham et al.

(10) Patent No.: US 10,193,933 B2
(45) Date of Patent: Jan. 29, 2019

(54) SYSTEM AND METHOD FOR POST-DISCOVERY COMMUNICATION WITHIN A NEIGHBORHOOD-AWARE NETWORK

(71) Applicant: QUALCOMM Incorporated, San Diego, CA (US)

(72) Inventors: Santosh Paul Abraham, San Diego, CA (US); George Cherian, San Diego, CA (US); Rolf De Vegt, San Francisco, CA (US)

(73) Assignee: Qualcomm Incorporated, San Diego, CA (US)

( * ) Notice: Subject to any disclaimer, the term of this patent is extended or adjusted under 35 U.S.C. 154(b) by 924 days.

(21) Appl. No.: 14/024,214

(22) Filed: Sep. 11, 2013

(65) Prior Publication Data

US 2014/0082205 A1 Mar. 20, 2014

Related U.S. Application Data

(60) Provisional application No. 61/716,372, filed on Oct. 19, 2012, provisional application No. 61/701,924, filed on Sep. 17, 2012.

(51) Int. Cl.
*H04W 8/00* (2009.01)
*H04L 29/06* (2006.01)

(52) U.S. Cl.
CPC ......... *H04L 65/1069* (2013.01); *H04W 8/005* (2013.01)

(58) Field of Classification Search
CPC ...... H04L 65/1069; H04W 8/005; H04W 4/00
See application file for complete search history.

(56) References Cited

U.S. PATENT DOCUMENTS 6,327,254 B1 * 12/2001 Chuah ..................... H04L 43/00
370/322
8,189,608 B2 * 5/2012 Duo ..................... H04W 48/16
370/338

(Continued)

FOREIGN PATENT DOCUMENTS

CN 101815286 A 8/2010
CN 102461314 A 5/2012

(Continued)

OTHER PUBLICATIONS

International Search Report and Written Opinion—PCT/US2013/059503—ISA/EPO—dated Dec. 20, 2013.

*Primary Examiner* — Aaron N Strange
(74) *Attorney, Agent, or Firm* — Knobbe, Martens, Olson & Bear, LLP

(57) ABSTRACT

In a particular embodiment, a method includes determining, at a first mobile device, a post-discovery communication technique for communicating within a mobile device cluster after a discovery interval. During the discovery interval, a discovery message may be sent. The discovery message indicates the post-discovery communication protocol for communicating within the mobile device cluster after the discovery interval. The discovery message may further indicate a time interval for sending and receiving a paging request. In response to the receipt of the discovery message a second mobile devices may send a paging request, the paging request including a security information request. The method further includes sending from the first mobile device a paging response including security information and exchanging one or more post-discovery communications with the second mobile device using the security information.

24 Claims, 8 Drawing Sheets

(56) References Cited

U.S. PATENT DOCUMENTS

| | | | |
|---|---|---|---|
| 8,391,260 B1* | 3/2013 | Kopikare | H04W 8/005 370/338 |
| 8,792,429 B2* | 7/2014 | Hassan | H04L 12/2818 370/329 |
| 9,137,347 B1* | 9/2015 | Lee | H04M 1/66 |
| 9,282,449 B2* | 3/2016 | Elhaddad | H04W 8/005 |
| 9,380,401 B1* | 6/2016 | Lambert | H04W 4/00 |
| 2007/0286136 A1* | 12/2007 | Rittle | H04W 8/005 370/338 |
| 2008/0031209 A1* | 2/2008 | Abhishek | H04W 8/005 370/338 |
| 2009/0217043 A1* | 8/2009 | Metke | G06F 21/445 713/171 |
| 2010/0240319 A1* | 9/2010 | Matsuo | H04W 52/0225 455/68 |
| 2010/0271959 A1 | 10/2010 | Qi et al. | |
| 2010/0329232 A1* | 12/2010 | Tubb | E05B 39/00 370/345 |
| 2011/0026504 A1 | 2/2011 | Feinberg | |
| 2011/0082939 A1 | 4/2011 | Montemurro et al. | |
| 2011/0103264 A1 | 5/2011 | Wentink | |
| 2011/0122835 A1 | 5/2011 | Naito et al. | |
| 2011/0280234 A1 | 11/2011 | Wentink | |
| 2011/0292864 A1* | 12/2011 | Sasao | H04W 88/04 370/315 |
| 2012/0151089 A1* | 6/2012 | Ponmudi | H04W 76/023 709/237 |
| 2012/0250576 A1 | 10/2012 | Rajamani et al. | |
| 2012/0281699 A1 | 11/2012 | Jia et al. | |
| 2013/0077525 A1* | 3/2013 | Bejerano | H04W 8/005 370/254 |
| 2013/0148643 A1 | 6/2013 | Abraham et al. | |
| 2014/0072119 A1* | 3/2014 | Hranilovic | H04L 9/3215 380/270 |

FOREIGN PATENT DOCUMENTS

| | | |
|---|---|---|
| CN | 102474704 A | 5/2012 |
| CN | 102547984 A | 7/2012 |

* cited by examiner

SYSTEM AND METHOD FOR POST-DISCOVERY COMMUNICATION WITHIN A NEIGHBORHOOD-AWARE NETWORK

INCORPORATION BY REFERENCE TO ANY PRIORITY APPLICATIONS

This application claims the benefit of priority to U.S. Provisional Patent Application No. 61/701,924 entitled "System and Method for Post-Discovery Communication within a Neighborhood-Aware Network," filed Sep. 17, 2012, and U.S. Provisional Patent Application No. 61/716,372 entitled "Systems and Methods Low Power Wake Up Signal and Operations for WLAN," filed Oct. 19, 2012.

BACKGROUND OF THE INVENTION

Field of the Invention

The present disclosure is generally related to neighborhood-aware networks (NANs).

Description of the Related Art

Advances in technology have resulted in smaller and more powerful computing devices. For example, there currently exist a variety of portable personal computing devices, including wireless computing devices, such as portable wireless telephones, personal digital assistants (PDAs), and paging devices that are small, lightweight, and easily carried by users. More specifically, portable wireless telephones, such as cellular telephones and interne protocol (IP) telephones, can communicate voice and data packets over wireless networks. Further, many such wireless telephones include other types of devices that are incorporated therein. For example, a wireless telephone can also include a digital still camera, a digital video camera, a digital recorder, and an audio file player. Also, such wireless telephones can process instructions, such as a web browser application that can be used to access the Internet. Memories, such as a memory within a wireless telephone or other electronic device, may store instructions in addition to other data.

As wireless devices become less expensive and more common, networks can experience increased traffic, potentially burdening the networks, slowing performance of the wireless devices, and frustrating users. Accordingly, network setup and network resource allocation (e.g., how traffic is routed within the network) are important considerations in designing and implementing wireless devices and wireless networks.

SUMMARY OF THE INVENTION

In at least one embodiment, techniques enable secure and power-efficient proximity-based services (e.g., via a neighborhood-aware network (NAN)). For example, in at least one embodiment, a discovery message indicates a post-discovery connection protocol, such as a communication channel for one or more post-discovery communications. The discovery message may indicate a "setup" technique for direct communication between mobile devices, such as mobile devices within a mobile device cluster, such as a cluster of mobile devices grouped based on a common mobile device application. The techniques may reduce burdens on "centralized" communication devices, such as access points (APs) and base stations, by enabling "direct" communication between mobile devices. In at least one embodiment, security information exchanged prior to the one or more post-discovery communications (e.g., during a paging interval) is utilized to secure the one or more post-discovery communications. Further, allocation of an Internet Protocol (IP) address may occur during the paging interval, which may enable a data transfer to begin sooner.

In a particular embodiment, a method includes determining, at a first mobile device, a post-discovery communication technique for communicating within a mobile device cluster after a discovery interval. During the discovery interval, a discovery message is sent. The discovery message indicates the post-discovery communication technique for communicating within the mobile device cluster after the discovery interval.

In a particular embodiment, a method includes receiving, by a first mobile device, a discovery message from a second mobile device indicating a post-discovery communication protocol. In response to receiving the discovery message, a paging request is sent to the second mobile device. The paging request includes a security information request. The method further includes receiving from the second mobile device a paging response including security information and exchanging one or more post-discovery communications with the second mobile device using the security information.

In a particular embodiment, a mobile device includes a processor and a memory coupled to the processor. The memory stores instructions executable by the processor to determine a post-discovery communication technique for communicating within a mobile device cluster after a discovery interval. The instructions are further executable by the processor to send, during the discovery interval, a discovery message indicating the post-discovery communication technique for communicating within the mobile device cluster after the discovery interval.

In another particular embodiment, a mobile device includes a processor and a memory coupled to the processor. The memory stores instructions executable by the processor to receive a discovery message from a second mobile device and, in response to receiving the discovery message, send to the second mobile device a paging request including a security information request. The instructions are further executable by the processor to receive from the second mobile device a paging response including security information and to exchange one or more post-discovery communications with the second mobile device using the security information.

In another particular embodiment, a method includes sending, by a first mobile device, a discovery message and receiving from a second mobile device a paging request including a security information request. In response to receiving the paging request, a paging response is sent to the second mobile device. The paging response includes security information. The method further includes exchanging one or more post-discovery communications with the second mobile device using the security information.

In another particular embodiment, a mobile device includes a processor and a memory coupled to the processor. The memory stores instructions executable by the processor to send a discovery message and to receive from a second mobile device a paging request. The paging request includes a security information request. The instructions are further executable by the processor to send a paging response to the second mobile device in response to receiving the paging request and to exchange one or more post-discovery communications with the second mobile device using security information. The paging response includes the security information.

One particular advantage provided by at least one of the disclosed embodiments is secure and power-efficient proximity-based services (e.g., a neighborhood-aware network (NAN)). The techniques may reduce burdens on "centralized" communication devices, such as access points (APs) and base stations, by enabling "direct" communication between mobile devices.

Other aspects, advantages, and features of the present disclosure will become apparent after review of the entire application, including the following sections: Brief Description of the Drawings, Detailed Description, and the Claims.

DETAILED DESCRIPTION

Figure 1:
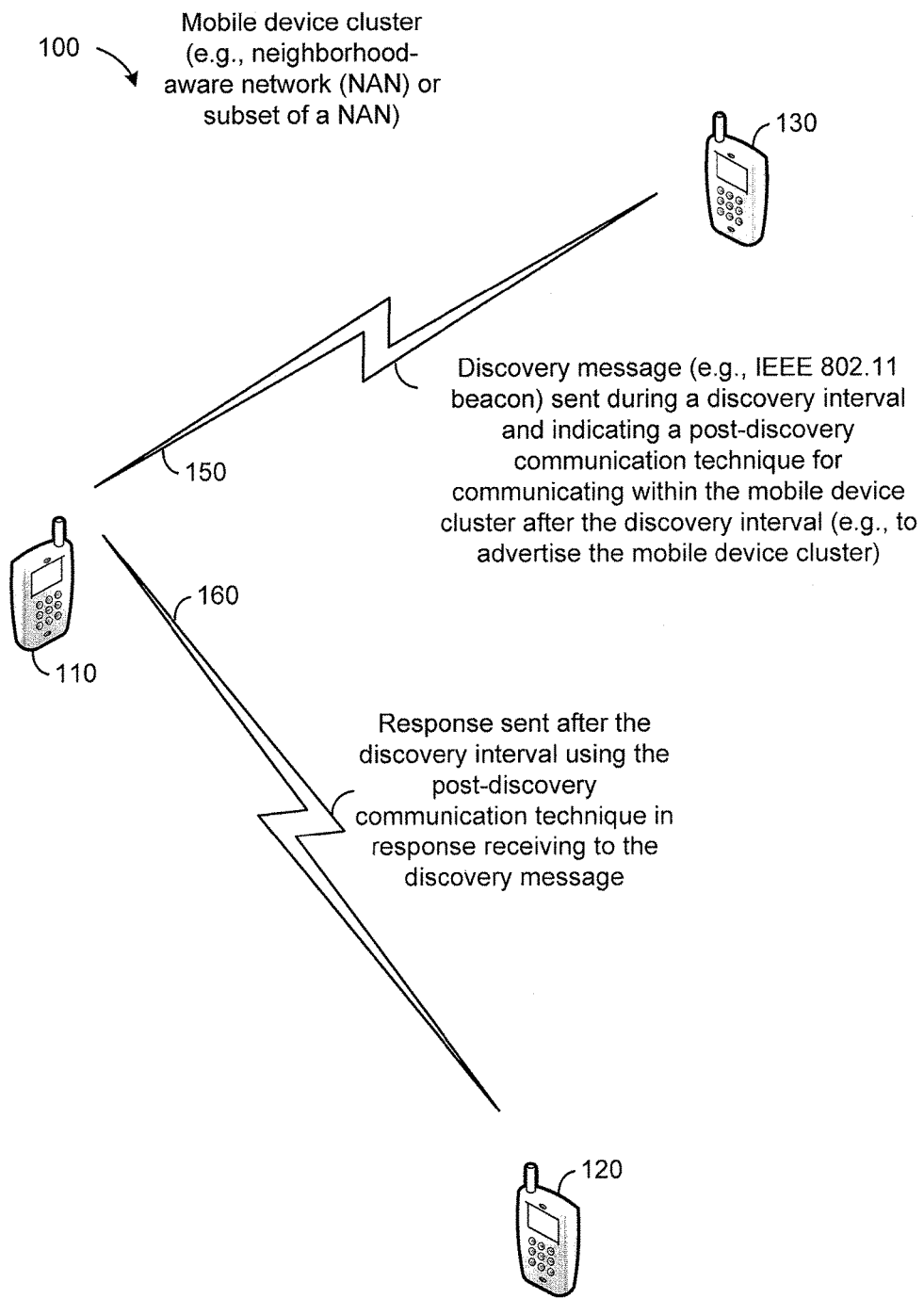
FIG. 1 depicts a particular illustrative embodiment of a mobile device cluster.

Referring to FIG. 1, a particular illustrative embodiment of a mobile device cluster is depicted and generally designated 100. The mobile device cluster 100 includes a first mobile device 110, a second mobile device 120, and a third mobile device 130. In at least one embodiment, the mobile device cluster 100 is a neighborhood-aware network (NAN) or is a subset of a NAN, such as a group of mobile devices associated with a common mobile device application.

Although the mobile device cluster 100 is illustrated as including three mobile devices in FIG. 1, the mobile device cluster 100 may include more than three devices or fewer than three devices. The mobile devices of the mobile device cluster 100 may be configured to communicate wirelessly according to one or more wireless communication protocols. For example, the mobile devices (e.g., the mobile devices 110, 120, 130) of the mobile device cluster 100 may send and receive discovery messages, such as beacons in connection with an Institute of Electrical and Electronics Engineers (IEEE) 802.11 protocol. In this context, a protocol refers to parameters used to communicate, such as a channel on which communications occur, timing of communications (e.g., timing of discovery intervals), etc. In another example, the mobile devices of the mobile device cluster 100 may also communicate data, such as data associated with a particular application that is common to each mobile device of the mobile device cluster 100.

In the particular embodiment depicted in FIG. 1, the first mobile device 110 may send a discovery message 150. The discovery message 150 may be sent during a time interval associated with advertisement of the mobile device cluster 100 to potential members of the mobile device cluster 100, such as a discovery interval. The discovery message 150 indicates a post-discovery communication technique or protocol for communicating within the mobile device cluster 100 after the discovery interval. The discovery message 150 may be a beacon in connection with an IEEE 802.11 protocol.

In the particular example of FIG. 1, the second mobile device 120 receives the discovery message 150 from the first mobile device 110. The second mobile device 120 may send a response 160 after the discovery interval (e.g., at a time associated with post-discovery communications). The response 160 is sent using the post discovery communication protocol and in response to receiving the discovery message 150.

The post discovery communication protocol may be associated with a particular application that is common to the mobile devices of the mobile device cluster 100. For example, the post discovery communication protocol may include a WiFi Direct communication technique, an always-on association communication technique, a public frame communication technique, another communication technique, or a combination thereof.

When the discovery message 150 indicates that the post discovery communication protocol is a WiFi Direct technique, the discovery message 150 may also include information that can be used by the second mobile device 120 to establish a connection to the first mobile device 110 using the WiFi Direct technique. For example, the discovery message 150 may indicate that the first mobile device 110 is a WiFi Direct group owner (GO). In another example, the discovery message 150 may indicate a time when the first mobile device 110 will be on (e.g., not in a low power or sleep state) to receive association requests. Thus, in response to the discovery message 150, the second mobile device 120, may send an association request associated with the WiFi Direct technique to the first mobile device 110 at the time when the first mobile device 110 will be on to receive association requests.

A public frame technique refers to a communication technique that uses public frames, such as generic advertisement service (GAS) frames. By using public frames, no association requests may be needed. Thus, in response to the discovery message 150 indicating that the post discovery communication technique is a public frame technique, the second mobile device 120 may send information or requests to the first mobile device 110 using public frames without first establishing an association with the first mobile device 110.

An always-on association technique refers to a communication technique in which a mobile device that has a particular application (such as a gaming application or a social-networking application) is preconfigured to communicate with other mobile devices that have the same particular application. For example, communication parameters, such as MAC addresses, timing information, encryption information, etc. may be stored in a memory of the second mobile device 120. When the second mobile device 120 receives the discovery message 150 and the discovery message indicates that the post-discovery communication technique is an always-on association technique associated with a particular application, the second mobile device 120 may access data associated with the first mobile device 110 and the particular application from a memory of the second mobile device 120. By using the always-on association technique, no association requests may be needed because information communicated via association requests and responses is already stored on devices that have the particular application. Thus, in response to the discovery message 150 indicating that the post discovery communication technique is an always-on association technique, the second mobile device 120 may send information or requests to the first mobile device 110 using information from a memory of the second mobile device 120.

Accordingly, in at least one embodiment, a method includes determining, at a first mobile device (e.g., at one of the mobile devices 110, 120, 130), a post-discovery communication protocol for communicating within a mobile device cluster (e.g., the mobile device cluster 100) after a discovery interval. The method further includes sending, during the discovery interval, a discovery message (e.g., the discovery message 150) indicating the post-discovery communication protocol for communicating within the mobile device cluster after the discovery interval.

In at least another particular embodiment, a method includes receiving, during a discovery interval and by a first mobile device (e.g., at one of the mobile devices 110, 120, 130) a discovery message (e.g., the discovery message 150) from a second mobile device (e.g., from another of the mobile devices 110, 120, 130). The discovery message indicates a post-discovery communication technique for communicating within a mobile device cluster (e.g., the mobile device cluster 100) after the discovery interval. In response to the discovery message and after the discovery interval, a response the response 160) is sent to the second mobile device using the post-discovery communication technique.

It will be appreciated that communication according to the example mobile device cluster 100 of FIG. 1 may enable efficient discovery of mobile device clusters and potential members of mobile device clusters. For example, as described further with reference to FIGS. 2-5, because the discovery message 150 of FIG. 1 indicates a post-discovery communication protocol for communicating after the discovery interval, direct communication between devices of a mobile device cluster (e.g., the mobile device cluster 100) is simplified, therefore potentially saving power consumption and processing resources.

Figure 2:
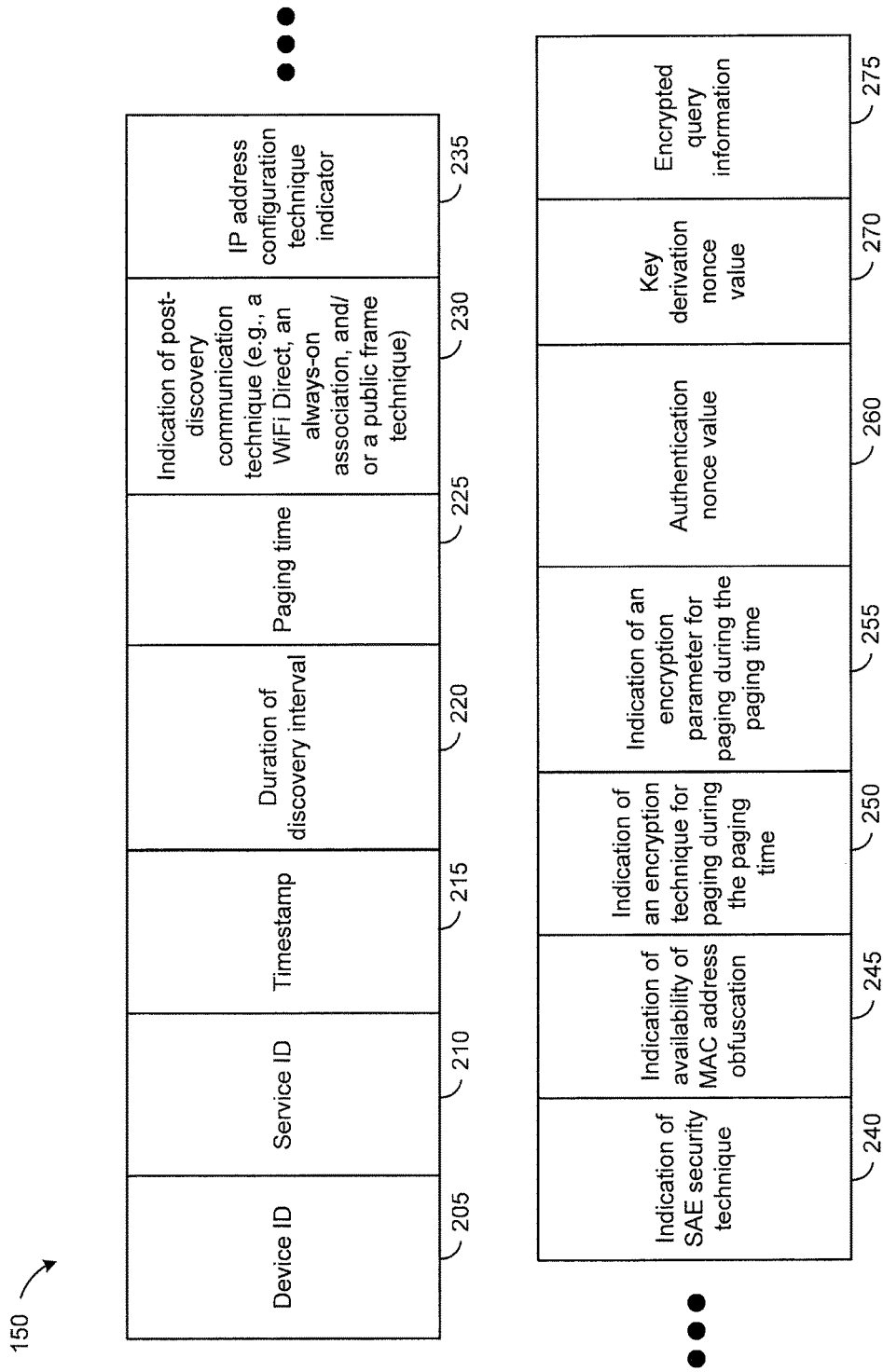
FIG. 2 depicts a particular illustrative embodiment of a discovery message sent by one or more of the mobile devices of FIG. 1.

FIG. 2 depicts a particular illustrative embodiment of the discovery message 150 of FIG. 1. For convenience of description, the discovery message 150 is described with reference to the first mobile device 110 of FIG. 1. However, it should be appreciated that the discovery message 150 of FIG. 2 may be sent by any of the mobile devices 110, 120, 130 of FIG. 1.

The example discovery message 150 of FIG. 2 may include a device identification (ID) 205 associated with the first mobile device 110, a service ID 210 associated with the first mobile device 110 (e.g., an identifier of an application related to the discovery message 150), a timestamp 215 associated with the discovery message 150 (e.g., a timestamp used to synchronize mobile device clocks within the mobile device cluster 100), an indication of a duration of a discovery interval 220, an indication 225 of a paging time, or a combination thereof. The indication 225 of the paging time may indicate a time at which the first mobile device 110 will be on or active to receive pages, such as paging requests in response to the discovery message 150.

The example discovery message 150 of FIG. 2 further includes an indication 230 of a post-discovery communication technique (e.g., an indication of whether a particular post-discovery communication technique is utilized by the first mobile device 110). The indication 230 may indicate a WiFi Direct technique (i.e., using WiFi Direct frames), an always-on association technique, and/or a public frame (e.g., a generic advertisement service (GAS) frame) technique. The discovery message 150 may further include an Internet Protocol (IP) address configuration technique indicator 235, an indication of a secure authentication of equals (SAE) security technique 240, an indication of availability of media access control (MAC) address obfuscation 245, an indication of an encryption technique for paging during the paging time 250, an indication of an encryption parameter for paging during the paging time 255, an authentication nonce value 260, a key derivation nonce value 270, an encrypted query information 275, or a combination thereof. As explained further below with reference to FIGS. 5-8, the discovery message 150 may further include an indication of a communication channel to be used for post-discovery communications.

It will be appreciated that because the discovery message 150 includes the indication 230 of the post-discovery communication technique, mobile devices may quickly determine compatibility with the mobile device that sent the discovery message 150. For example, the mobile devices may determine compatibility with a post-discovery communication protocol used by the first mobile device 110 based on the discovery message 150. Further, the mobile devices may efficiently set up connections or associations with the device that sent the discovery message 150 or other devices of the mobile device cluster using the indicated post discovery communication technique.

Figure 3:
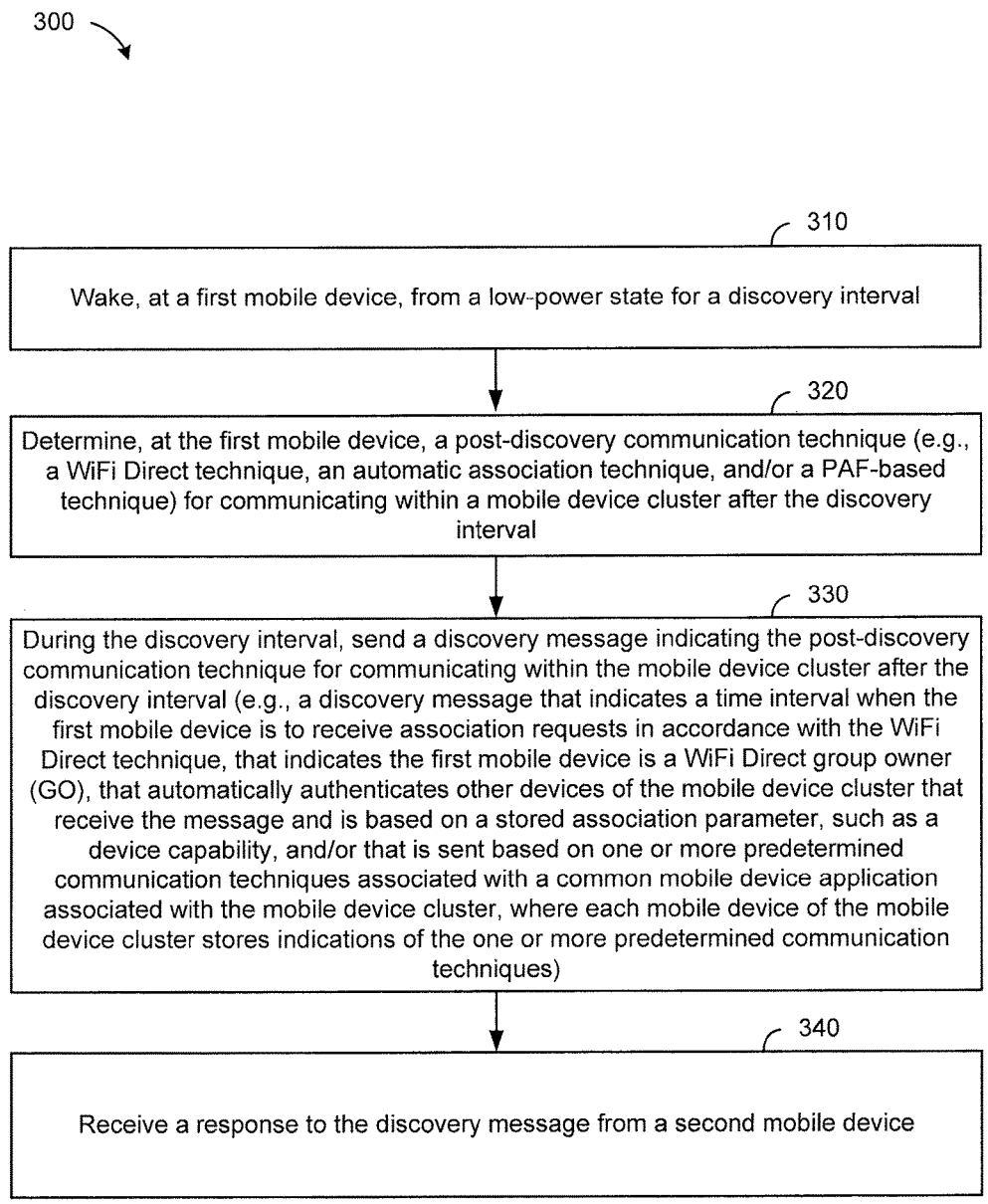
FIG. 3 depicts a particular illustrative embodiment of a method of operation of one or more of the mobile devices of FIG. 1.

Referring to FIG. 3, a particular illustrative embodiment of a method of operation of a mobile device is depicted and generally designated 300. The method 300 may be performed by one or more of the mobile devices 110, 120, 130 of FIG. 1.

The method 300 includes waking, at the mobile device, from a low power state for a discovery interval, at 310. At 320, a determination is made at the first mobile device of a post-discovery communication technique. The post-discovery communication technique may include one or more of a WiFi-based technique (e.g., a WiFi Direct technique), an automatic association technique (e.g., a technique whereby particular devices that receive a discovery message from the first mobile device can be automatically associated with the first mobile device without sending association requests, such as an always-on association technique), and a public frame or public action frame (PAF) based technique (e.g., a generic advertisement service (GAS) technique). The post-discovery communication technique may be used for communication within a mobile device cluster (e.g., the mobile device cluster 100 of FIG. 1) after the discovery interval.

The method 300 further includes sending, during the discovery interval, a discovery message, such as the discovery message 150 of FIG. 1, the discovery message 150 of FIG. 2, or a combination thereof, at 330. The discovery message indicates the post-discovery communication protocol for communicating within the mobile device cluster after the discovery interval. For example, the discovery message may indicate a time interval when the first mobile device is to receive association requests in accordance with the WiFi Direct technique, may indicate that the first mobile device is a WiFi Direct group owner (GO) (e.g., a WiFi Direct GO associated with the mobile device cluster), may automatically authenticate other devices of the mobile device cluster that receive the message, may be based on one or more stored association parameters, such as a device capability of one or more mobile devices of the mobile device cluster, and/or may be sent based on one or more predetermined communication techniques associated with a common mobile device application associated with the mobile device cluster, where each mobile device of the mobile device cluster stores indications of the one or more predetermined communication techniques.

At 340, the method further includes receiving a response to the discovery message from a second mobile device. The response may be a query in response to the discovery message, a request to join the mobile device cluster, another message, or a combination thereof.

Figure 4:
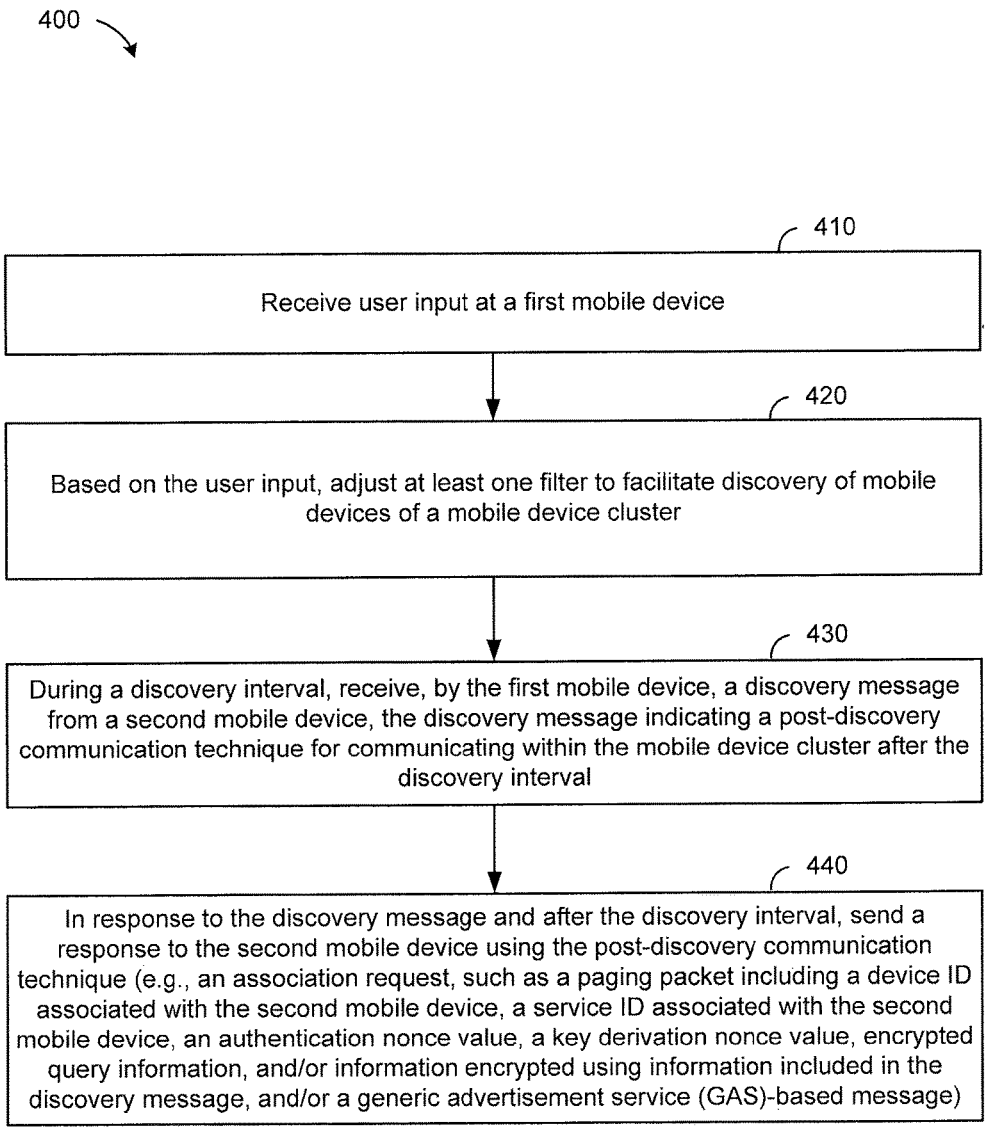
FIG. 4 depicts a particular illustrative embodiment of another method of operation of one or more of the mobile devices of FIG. 1.

Referring to FIG. 4, a particular illustrative embodiment of a method of operation of a first mobile device is depicted and generally designated 400. The first mobile device described with reference to FIG. 4 may be one or more of the mobile devices 110, 120, 130 described with reference to FIG. 1.

The method 400 includes receiving user input at the first mobile device, at 410. Based on the user input, at least one filter of the first mobile device is adjusted to facilitate discovery of mobile devices of a mobile device cluster, at 420. The mobile device cluster may be the mobile device cluster 100 of FIG. 1. For example, if a user of the mobile device enters a particular area, such as a shopping area, the user may enter user input corresponding to an item or subject of interest, such as "fruits" for a grocery or farmer's market. The first mobile device may adjust the at least one filter, for example to receive messages related to fruits from vendors, advertisements, other messages, or a combination thereof. The messages may include the discovery message 150 of FIG. 1. The messages may indicate that the vendor or other sender of the messages is a WiFi Direct group owner (GO) in connection with a WiFi Direct technique.

The method 400 further includes receiving, by the first mobile device and during a discovery interval, a discovery message from a second mobile device, at 430. The discovery message may be the discovery message 150 of FIG. 1, the discovery message 150 of FIG. 2, or a combination thereof. The discovery message indicates a post-discovery communication technique for communicating within the mobile device cluster after the discovery interval.

At 440, in response to the discovery message and after the discovery interval, the first mobile device may send a response to the second mobile device using the post-discovery communication technique. For example, the response may be an association request, such as a paging packet (e.g., a paging request, as described below with reference to FIGS. 5-8) including a device ID associated with the first mobile device, a service ID associated with the first mobile device, an authentication nonce value received from the second mobile device via the discovery message, a key derivation nonce value received from the second mobile device via the discovery message, encrypted query information, and/or information encrypted using information included in the discovery message, and/or a generic advertisement service (GAS)-based message. The response may be generated based on second user input at the first mobile device. For example, continuing with the foregoing example, the second user input may indicate a query for additional information related to an advertisement sent by a vendor via a discovery message.

Figure 5:
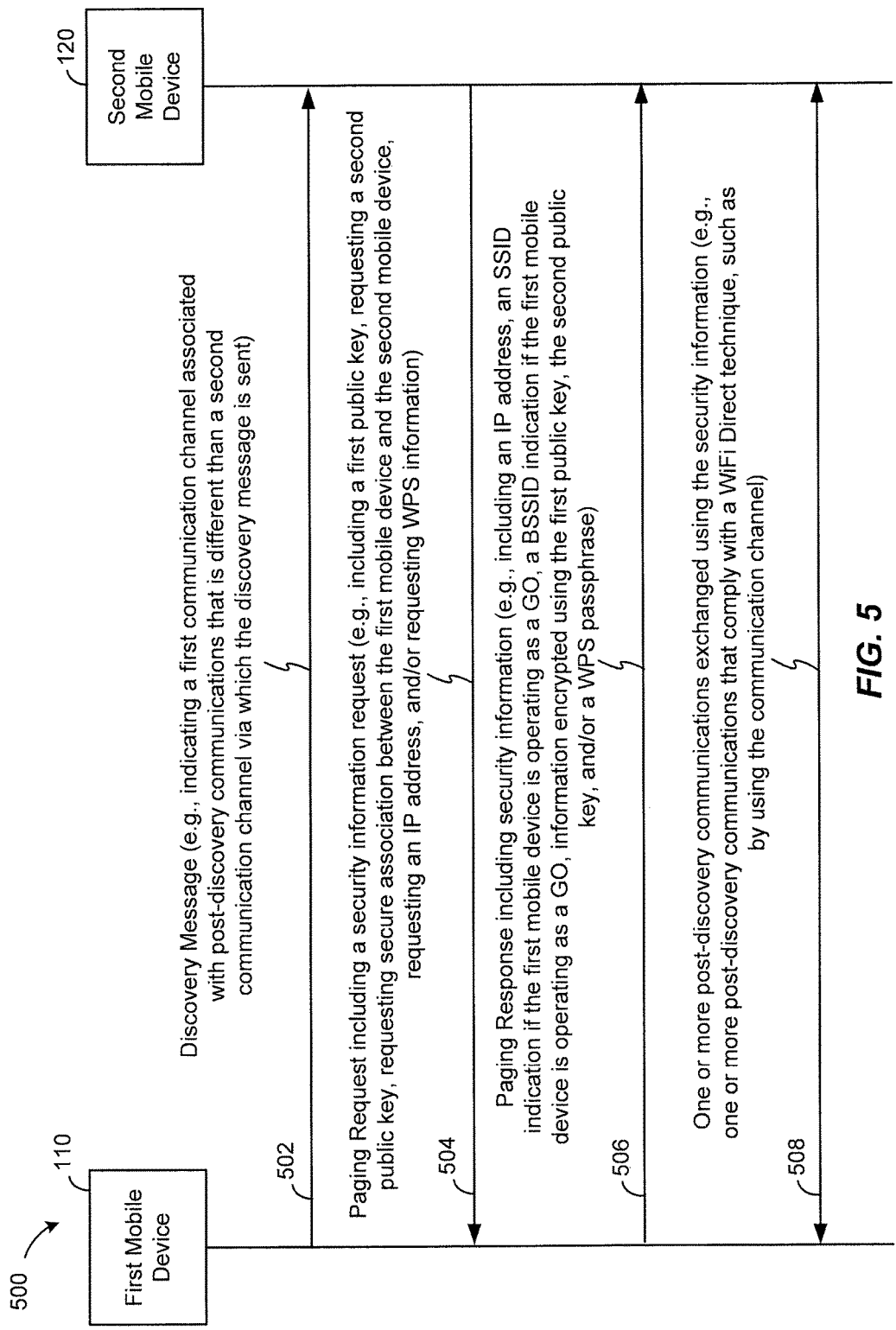
FIG. 5 depicts a particular illustrative embodiment of a method of operation of two mobile devices, such as two of the mobile devices of FIG. 1.

Referring to FIG. 5, a particular illustrative embodiment of a method of communication between two mobile devices is depicted and generally designated 500. As shown in the example of FIG. 5, the method 500 may be performed by the first mobile device 110 and the second mobile device 120 described with reference to FIG. 1.

The method 500 includes sending a discovery message by the first mobile device 110, at 502. The discovery message may be the discovery message 150 of FIG. 1, the discovery message 150 of FIG. 2, or a combination thereof. The discovery message may be received during a particular discovery interval. The discovery message may indicate information for post-discovery communication, such as a first communication channel for post-discovery communication between the first mobile device 110 and another mobile device, such as the second mobile device 120. The first communication channel may be different than a second communication channel via which the discovery message is sent. In a particular embodiment, the first communication channel is associated with a WiFi Direct technique for exchanging post-discovery communications (i.e., communications after a particular discovery interval during which the discovery message is sent).

The method 500 further includes sending by the second mobile device 120 a paging request including a security information request, at 504. The paging request may be sent during a particular paging interval (e.g., during a paging interval associated with the particular discovery interval), such as the paging time specified by the indication 225 of FIG. 2. The security information request may request or include credentials for secure association between the first mobile device 110 and the second mobile device 120. For example, the security information may include a first public key corresponding to the second mobile device 120, may request a second public key corresponding to the first mobile device 110, or a combination thereof. Alternatively or in addition, the paging request may request the first mobile device 110 to assign an Internet Protocol (IP) address to the second mobile device 120. The security information request may request WiFi Protected Setup (WPS) information, such as a WPS passphrase, from the first mobile device 110, as described further below.

At 506, the first mobile device sends a paging response including security information. The paging response may be sent during the particular paging interval. The security information included in the paging response sent by the first mobile device 110 may correspond to the security information requested in the paging request sent by the second mobile device 120. For example, the paging response may include a second public key corresponding to the first mobile device 110, information encrypted based on the first public key, or a combination thereof. The paging response may include a WPS passphrase associated with the first mobile device 110. In at least one embodiment, if the first mobile device 110 is operating as a group owner (GO) in connection with the WiFi Direct technique, the paging response includes an indication of a service set identification (SSID) associated with the first mobile device 110, an indication of a basic service set identification (BSSID) associated with the first mobile device 110, or a combination thereof. In a particular illustrative embodiment, the paging request and the paging response are communicated during the paging time specified by the indication 225 described with reference to FIG. 2.

The method 500 further includes exchanging one or more post-discovery communications using the security information (e.g., a communication from the first mobile device 110 to the second mobile device 120, a communication from the second mobile device 120 to the first mobile device 110, or a combination thereof), at 508. For example, the one or more post-discovery communications may be secured using security credentials exchanged via the paging request, the paging response, or a combination thereof, as described further with reference to FIGS. 6-8. The one or more post-discovery communications may comply with the WiFi Direct technique. The one or more post-discovery communications may be communicated via the first communication channel indicated in the discovery message. Further, the one or more post-discovery communications may occur after the particular discovery interval, after the particular paging interval, or after both the particular discovery interval and the particular paging interval.

In at least one embodiment, the method 500 of FIG. 5 enables secured post-discovery WiFi Direct communication using security information included in one or more paging messages (e.g., the paging request and the paging response), which may be exchanged during a paging interval (e.g., the paging time specified by the indication 225 of FIG. 2). Accordingly, by exchanging security information (e.g., associating) during the paging interval, devices may avoid exchanging such information during post-discovery communications. Further, by indicating the first communication channel in the discovery message, the second mobile device may avoid having to rescan for a communication channel after receiving the discovery message. In addition, establishing the IP address for the second mobile device 120 via the paging messages (e.g., instead of during the one or more post-discovery communications) may enable the second mobile device 120 to begin to receive data sooner, which may be advantageous, for example, if the one or more post-discovery communications include a transfer of a large amount of data to the second mobile device 120.

Figure 6:
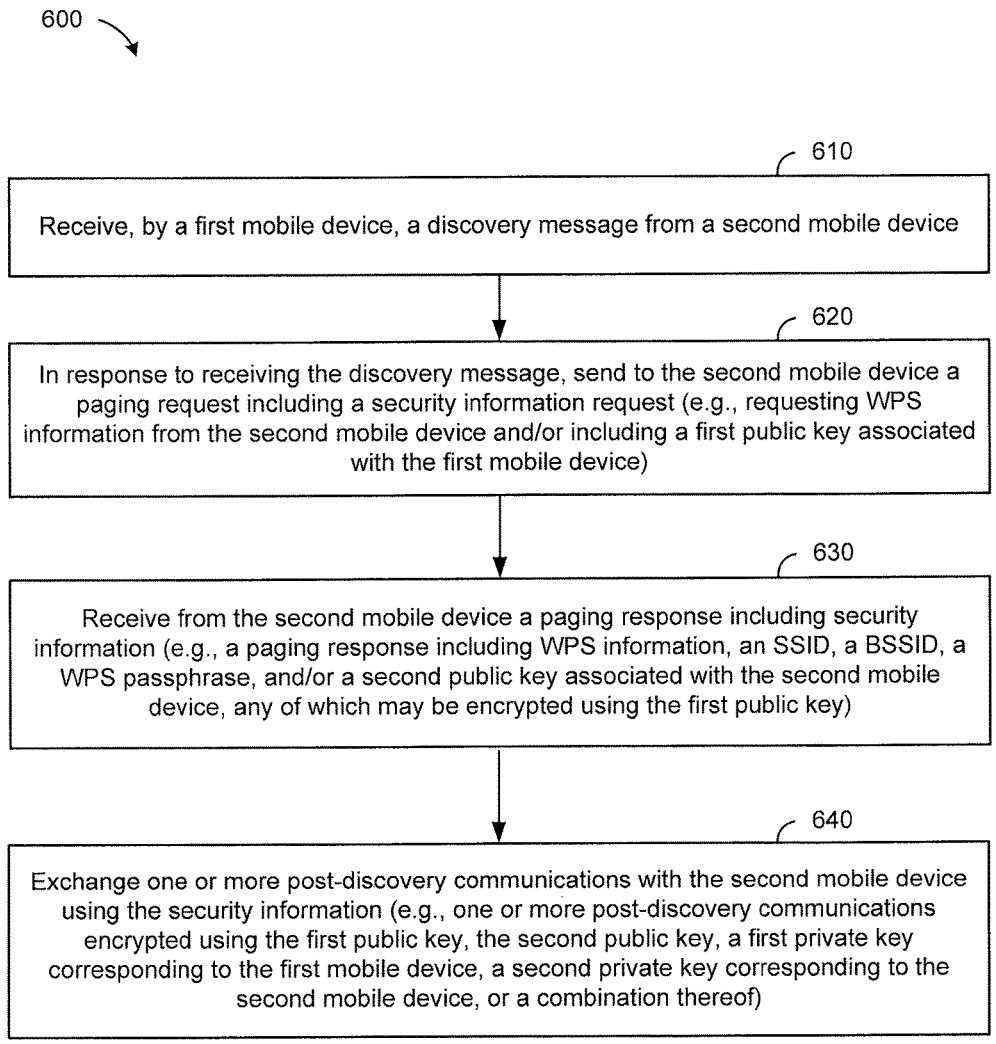
FIG. 6 depicts a particular illustrative embodiment of a method of operation of one or more of the mobile devices of FIG. 5.

Referring to FIG. 6, a method of operation of a mobile device is depicted and generally designated 600. The method 600 includes receiving, by a first mobile device, a discovery message from a second mobile device, at 610. The first mobile device may be any of the mobile devices described with reference to FIGS. 1-5, such as the first mobile device 110, the second mobile device 120, the third mobile device 130, or a combination thereof. The second mobile device may be another of the mobile devices described with reference to FIGS. 1-5, such as the first mobile device 110, the second mobile device 120, the third mobile device 130, or a combination thereof. The discovery message may correspond to the discovery message 150 of FIG. 1, the discovery message 150 of FIG. 2, or a combination thereof. According to a particular example, the discovery message indicates a type of data stored at the second mobile device (e.g., a picture file, a video file, an audio file, or a combination thereof), a technique for requesting the data from the second mobile device (e.g., by indicating an email address to the second mobile device), or a combination thereof.

In response to receiving the discovery message, a paging request is sent to the second mobile device, at 620. For example, continuing with the foregoing particular example, the first mobile device may determine based on the discovery message that the second mobile device has data (e.g., a picture file, a video file, an audio file, or a combination thereof) to be sent to the first mobile device and may send to the second mobile device an email address corresponding to the first mobile device. As shown in FIG. 6, the paging request includes a security information request. For example, the paging request may request WiFi Protected Setup (WPS) information from the second mobile device, may include a first public key associated with the first mobile device, or a combination thereof.

At 630, a paging response is received from the second mobile device. The paging response includes security information. For example, the paging response may include WPS information, such as a WPS passphrase associated with the second mobile device, an indication of a service set identification (SSID) associated with the second mobile device, an indication of a basic service set identification (BSSID) associated with the second mobile device, a second public key corresponding to the second mobile device, or a combination thereof. Further, one or more of the WPS, the WPS passphrase, the indication of the SSID, the indication of the BSSID, and the second public key may be secured (e.g., encrypted) using the first public key.

At 640, one or more post-discovery communications are exchanged with the second mobile device using the security information. The one or more post-discovery communications may be encrypted using the first public key, the second public key, a first private key corresponding to the first mobile device, a second private key corresponding to the second mobile device, or a combination thereof.

Figure 7:
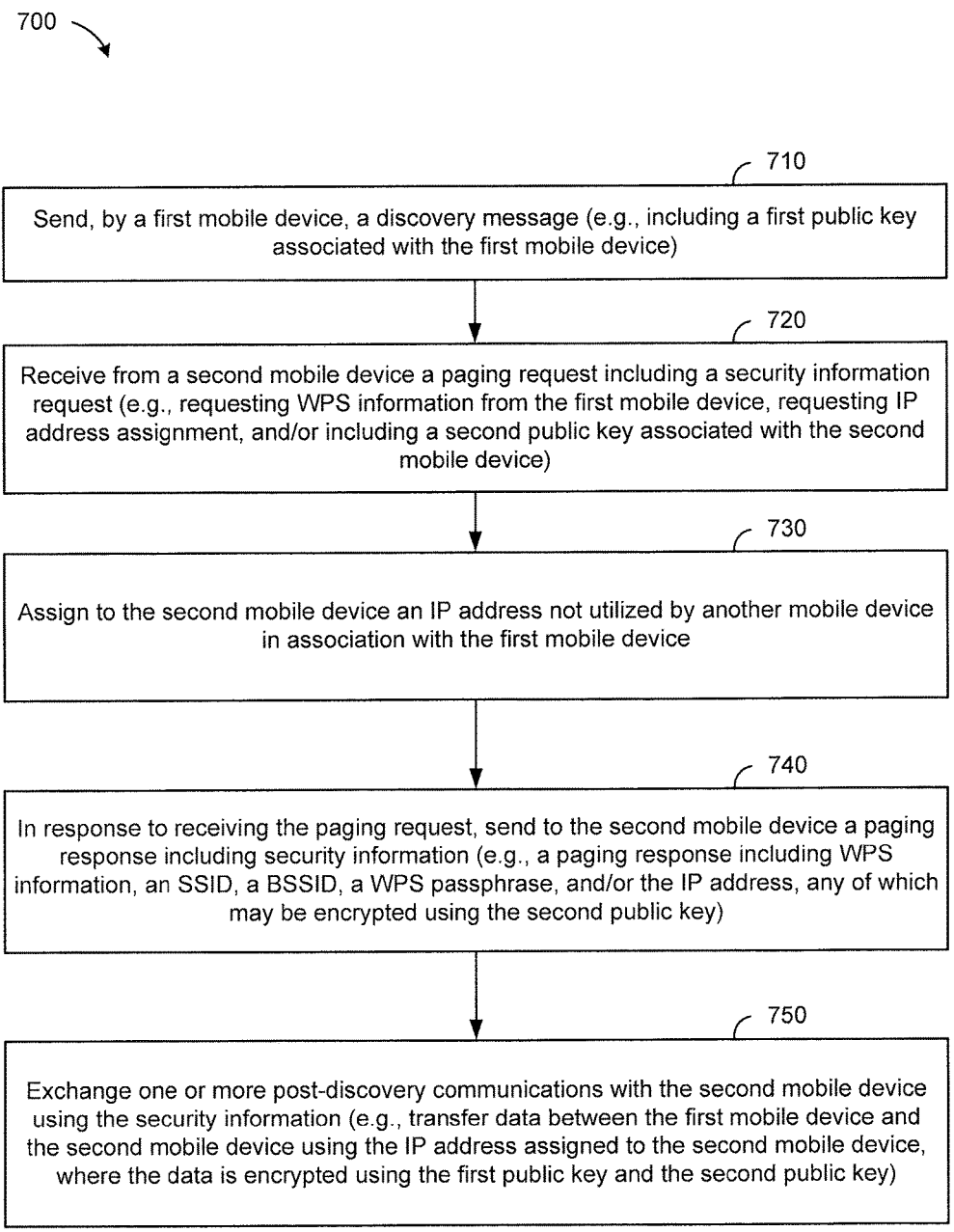
FIG. 7 depicts a particular illustrative embodiment of a method of operation of one or more of the mobile devices of FIG. 5.

Referring to FIG. 7, a method of operation of a mobile device is depicted and generally designated 700. The method 700 includes sending, by a first mobile device, a discovery message, at 710. The first mobile device may be any of the mobile devices described with reference to FIGS. 1-6, such as the first mobile device 110, the second mobile device 120, the third mobile device 130, or a combination thereof. In a particular embodiment, the discovery message includes a first public key associated with the first mobile device.

The method 700 further includes receiving from a second mobile device a paging request including a security information request, at 720. The second mobile device may be another of the mobile devices described with reference to FIGS. 1-6, such as the first mobile device 110, the second mobile device 120, the third mobile device 130, or a combination thereof. The discovery message may correspond to the discovery message 150 of FIG. 1, the discovery message 150 of FIG. 2, or a combination thereof. The paging request may request WiFi Protected Setup (WPS) information from the first mobile device, may include a second public key associated with the second mobile device, or a combination thereof. Alternatively or in addition, the paging request may request Internet Protocol (IP) address assignment for the second mobile device.

The method 700 may further include assigning to the second mobile device an IP address not utilized by another mobile device in association with the first mobile device, at 730. For example, the first mobile device may select the IP address from a list of IP addresses not currently in use by devices in association with the first mobile device, may analyze a list of IP addresses that are currently in use by devices in association with the first mobile device to determine the IP address, or a combination thereof. According to further embodiments, the IP address may be selected by the second mobile device, or the IP address may be assigned during post-discovery communications exchanged by the first mobile device and the second mobile device.

At 740, in response to receiving the paging request, a paging response is sent to the second mobile device. The paging response includes security information. For example, the paging response may include WPS information, such as a WPS passphrase associated with the first mobile device, an indication of a service set identification (SSID) associated with the first mobile device, an indication of a basic service set identification (BSSID) associated with the first mobile device, the IP address, or a combination thereof. Further, one or more of the WPS, the WPS passphrase, the indication of the SSID, and the indication of the BSSID may be secured (e.g., encrypted) using the second public key.

At 750, one or more post-discovery communications are exchanged with the second mobile device using the security information. In a particular embodiment, the one or more post-discovery communications include a transfer of data (e.g., from the first mobile device to the second mobile device) using the IP address assigned to the second mobile device. The one or more post-discovery communications may be encrypted using the first public key and the second public key.

Figure 8:
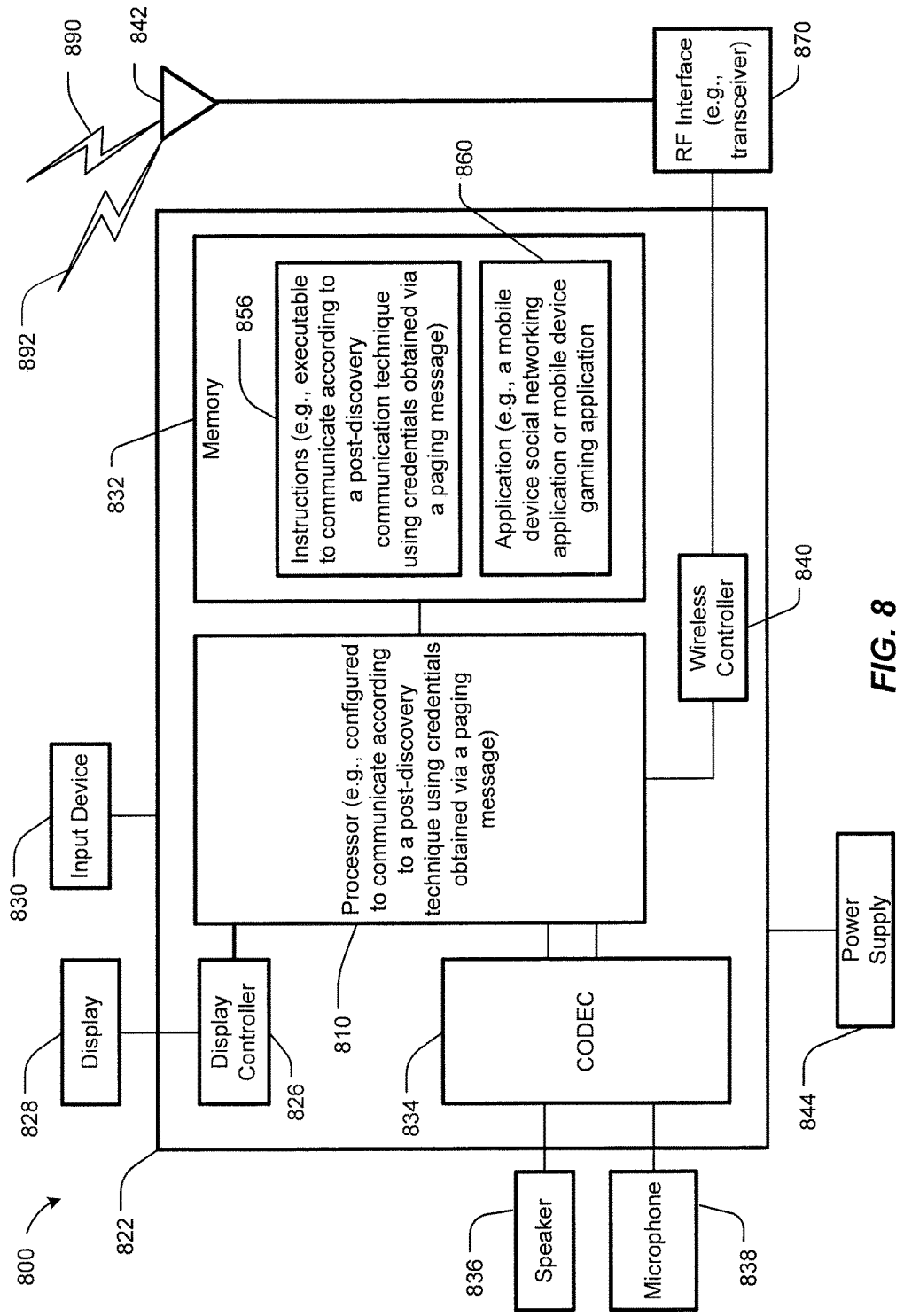
FIG. 8 depicts a particular illustrative embodiment of one or more of the mobile devices of FIG. 5.

Referring to FIG. 8, a block diagram of a particular illustrative embodiment of one or more of the mobile devices described with reference to FIGS. 1-7, such as the mobile devices 110, 120, 130 of any of FIGS. 1 and 5, is depicted and generally designated 800. The mobile device 800 of FIG. 8 includes a processor 810 and at least one non-transitory computer-readable medium (e.g., a memory 832) coupled to the processor. The memory 832 may include instructions 856 executable by the processor 810.

The processor 810 may be further configured to or may execute the instructions 856 to communicate according to a post discovery technique (e.g., a Wi-Fi direct technique) using credentials (e.g., a passphrase, encryption/decryption keys, or a combination thereof) obtained via a paging message (e.g., a paging request, a paging response, or a combination thereof). For example, in a particular embodiment, the processor 810 executes the instructions 856 perform one or more operations described reference to the method 500 of FIG. 5, the method 600 of FIG. 6, the method 700 of FIG. 7, or a combination thereof.

The processor 810 may further be configured to or may execute the instructions 856 to determine a post-discovery communication protocol for communicating within a mobile device cluster after a discovery interval and to send, during the discovery interval, a discovery message 890 indicating the post-discovery communication technique for communicating within the mobile device cluster after the discovery interval. The discovery message 890 of FIG. 8 may correspond to the discovery message 150 of FIG. 1, the discovery message 150 of FIG. 2, or a combination thereof.

The processor 810 may be configured to or may execute the instructions 856 to receive, during a discovery interval, a discovery message 892 from a second mobile device (e.g., another of the mobile devices 110, 120, 130). The discovery message 892 indicates a post-discovery communication protocol for communicating within a mobile device cluster (e.g., the mobile device cluster 100) after the discovery interval. The processor 810 may be further configured to or may execute the instructions 856 to send a response (e.g., the response 160) to the second mobile device using the post-discovery communication protocol. The discovery message 892 of FIG. 8 may correspond to the discovery message 150 of FIG. 1, the discovery message 150 of FIG. 2, or a combination thereof.

The memory 832 may store additional instructions, data, or a combination thereof. For example, the memory 832 may store an application 860. In a particular illustrative embodiment, the application 860 is a common application shared by each device of a mobile device cluster, such as the mobile device cluster 100. The application 860 may be a mobile device social networking application, a mobile device gaming application, or a combination thereof. The memory 832 may store information related to WiFi communication between mobile devices, such as information related to a WiFi Direct communication technique, such as a communication channel for WiFi Direct communication indicated by a discovery message. When the post discovery communication technique is an always-on association technique, the memory 832 may include communication parameters associated with one or more other mobile communication devices that use the always-on association technique, such as other devices that include the application 860.

Alternatively or in addition, the memory 832 may store information related to one or more predetermined communication techniques associated with the application 860 and further associated with the mobile device cluster. For example, in at least one embodiment, each mobile device of the mobile device cluster stores (e.g., is initially "provisioned" with) indications of the one or more predetermined communication techniques. Further, the memory 832 may store association parameters associated with association between mobile devices of the mobile device cluster. For example, the memory 832 may store device capabilities associated with one or more mobile devices of the mobile device cluster (e.g., whether a particular mobile device of the mobile device cluster utilizes a single-antenna or a multiple-antenna structure, other device capabilities, or a combination thereof). In at least one embodiment, because each of the mobile devices stores such indications of the one or more predetermined communication techniques and the association parameters, post-discovery communication is simplified.

Alternatively or in addition, the memory 832 may store information related to public frame or public action frame (PAF)-based communication techniques, such as information related to generic advertisement service (GAS) frames. Using the PAF-based communication techniques may reduce or avoid post-discovery connection setup by using "generic" frames, thus potentially simplifying communication within the mobile device cluster.

FIG. 8 also shows a display controller 826 that is coupled to the processor 810 and to a display 828. A coder/decoder (CODEC) 834 can also be coupled to the processor 810. A speaker 836 and a microphone 838 can be coupled to the CODEC 834. FIG. 8 also indicates that a wireless controller 840 can be coupled to the processor 810, to a radio frequency (RF) interface 870 (e.g., a transceiver), and to a wireless antenna 842.

In a particular embodiment, the processor 810, the display controller 826, the memory 832, the CODEC 834, and the wireless controller 840 are included in a system-in-package or system-on-chip device 822. In a particular embodiment, an input device 830 and a power supply 844 are coupled to the system-on-chip device 822. Moreover, in a particular embodiment, as illustrated in FIG. 8, the display 828, the input device 830, the speaker 836, the microphone 838, the RF interface 870, the wireless antenna 842, and the power supply 844 are external to the system-on-chip device 822. However, each of the display 828, the input device 830, the speaker 836, the microphone 838, the RF interface 870, the wireless antenna 842, and the power supply 844 can be coupled to a component of the system-on-chip device 822, such as an interface or a controller.

Those of skill would further appreciate that the various illustrative logical blocks, configurations, modules, circuits, and algorithm steps described in connection with the embodiments disclosed herein may be implemented as electronic hardware, computer software, or combinations of both. Various illustrative components, blocks, configurations, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure.

The steps of a method or algorithm described in connection with the embodiments disclosed herein may be embodied directly in hardware, in a software module executed by a processor, or in a combination of the two. A software module may reside in random access memory (RAM), flash memory, read-only memory (ROM), programmable read-only memory (PROM), erasable programmable read-only memory (EPROM), electrically erasable programmable read-only memory (EEPROM), registers, hard disk, a removable disk, a compact disc read-only memory (CD-ROM), or any other form of storage medium known in the art. An exemplary non-transitory (e.g., tangible) storage medium is coupled to the processor such that the processor can read information from, and write information to, the storage medium. In the alternative, the storage medium may be integral to the processor. The processor and the storage medium may reside in an application-specific integrated circuit (ASIC). The ASIC may reside in a computing device or a user terminal. In the alternative, the processor and the storage medium may reside as discrete components in a computing device or user terminal.

The previous description of the disclosed embodiments is provided to enable a person skilled in the art to make or use the disclosed embodiments. Various modifications to these embodiments will be readily apparent to those skilled in the art, and the principles defined herein may be applied to other embodiments without departing from the scope of the disclosure. Thus, the present disclosure is not intended to be limited to the embodiments shown herein but is to be accorded the widest scope possible consistent with the principles and novel features as defined by the following claims.

What is claimed is:

1. A method comprising:
    determining, at a first mobile device, a post-discovery communication protocol for communicating within a mobile device cluster after a discovery interval;
    during the discovery interval, sending, through a first communication channel, a discovery message indicating which particular post-discovery communication protocol of a plurality of post-discovery communication protocols is the determined post-discovery communication protocol, the discovery message indicating a time interval when the first mobile device is to receive association requests, wherein the discovery message indicates a second communication channel for sending post-discovery communications to a second mobile device, wherein the second communication channel is different than the first communication channel;
    in response to sending the discovery message, receiving, from the second mobile device, during the indicated time interval, an association request that includes a security information request and a paging request; and
    sending one or more post-discovery communications to the second mobile device based on the security information request.

2. The method of claim 1, wherein the plurality of post-discovery communication protocols comprises WiFi Direct, always-on association technique, and a public frame technique, and the determined post-discovery communication protocol is WiFi Direct.

3. The method of claim 1, wherein the discovery message indicates an authentication nonce value, or a key derivation nonce value, and the association request is a paging packet that the authentication nonce value, the key derivation nonce value, information encrypted using information included in the discovery message, or a combination thereof.

4. The method of claim 1, wherein the post-discovery communication protocol includes an automatic association technique, and wherein sending the discovery message automatically associates the first mobile device with other devices of the mobile device cluster that receive the discovery message.

5. The method of claim 4, wherein the discovery message is sent based on one or more predetermined communication protocols associated with a common mobile device application associated with the mobile device cluster, wherein each mobile device of the mobile device cluster stores indications of the one or more predetermined communication techniques and further stores one or more association parameters.

6. The method of claim 1, wherein the mobile device cluster is a neighborhood-aware network (NAN) of mobile devices.

7. The method of claim 1, further comprising waking from a low-power state for the discovery interval.

8. The method of claim 1, wherein the security information request requests WiFi Protected Setup (WPS) information from the second mobile device.

9. The method of claim 1, wherein the paging request further includes a first public key associated with the first mobile device, and wherein a paging response further includes a second public key associated with the second mobile device.

10. The method of claim 1, wherein the discovery message includes a first public key associated with the second mobile device, wherein the paging request includes a second public key associated with the first mobile device, and wherein the post-discovery communications are encrypted using the first public key and the second public key.

11. A mobile device comprising:
    a hardware processor; and
    a memory coupled to the hardware processor, and storing instructions executable by the processor to:
        determine a post-discovery communication protocol for communicating within a mobile device cluster after a discovery interval;
        during the discovery interval, send, through a first communication channel, a discovery message indicating which particular post-discovery communication protocol of a plurality of post-discovery communication protocols is the determined post-discovery communication protocol, the discovery message indicating a time interval when the first mobile device is to receive association requests, wherein the discovery message indicates a second communication channel for sending post-discovery communications to a second mobile device, wherein the second communication channel is different than the first communication channel;
        in response to sending the discovery message, receive, from the second mobile device, during the indicated time interval, an association request that includes a security information request and a paging request; and
        send one or more post-discovery communications to the second mobile device based on the security information request.

12. The apparatus of claim 11, wherein the plurality of post-discovery communication protocols comprises WiFi Direct, always-on association technique, and a public frame technique, and the determined post-discovery communication protocol is WiFi Direct.

13. A method comprising:
during a discovery interval, receiving, by a first mobile device, through a first communication channel, a discovery message from a second mobile device, the discovery message indicating which particular post-discovery communication protocol for communicating within a mobile device cluster after the discovery interval is utilized for communicating within a mobile device cluster after the discovery interval, the discovery message indicating a time interval when the first mobile device is to receive association requests, wherein the discovery message indicates a second communication channel for receiving post-discovery communications from a second mobile device, wherein the second communication channel is different than the first communication channel;
in response to the discovery message and after the discovery interval, sending a response to the second mobile device using the post-discovery communication protocol;
in response to receiving the discovery message, sending a message to the second mobile device during the time interval, the message including a security information request and a paging request; and
receiving one or more post-discovery communications from the second mobile device based on the security information request.

14. The method of claim 13, wherein the plurality of post-discovery communication protocols comprises WiFi Direct, always-on association technique, and a public frame technique, and the indicated particular post-discovery communication protocol comprises WiFi Direct.

15. The method of claim 13, wherein the discovery message indicates an authentication nonce value, or a key derivation nonce value, and the association request is a paging packet that includes the authentication nonce value from the discovery message, the key derivation nonce value from the discovery message, information encrypted using information included in the discovery message, or a combination thereof.

16. The method of claim 13, wherein the post-discovery communication technique includes an automatic association technique, and wherein receiving the discovery message automatically associates the first mobile device with the mobile device cluster.

17. The method of claim 16, wherein the discovery message is sent based on one or more predetermined communication protocols associated with a common mobile device application associated with the mobile device cluster, wherein each mobile device of the mobile device cluster stores indications of the one or more predetermined communication techniques and further stores one or more association parameters.

18. The method of claim 13, wherein the mobile device cluster is a neighborhood-aware network (NAN) of mobile devices.

19. The method of claim 13, further comprising waking from a low-power state for the discovery interval.

20. The method of claim 13, wherein the security information request requests WiFi Protected Setup (WPS) information from the second mobile device.

21. The method of claim 13, wherein the paging request further includes a first public key associated with the first mobile device, and wherein the response further includes a second public key associated with the second mobile device.

22. The method of claim 13, wherein the discovery message includes a first public key associated with the second mobile device, wherein the paging request includes a second public key associated with the first mobile device, and wherein the post-discovery communications are encrypted using the first public key and the second public key.

23. A mobile device comprising:
a hardware processor; and
a memory coupled to the hardware processor, and storing instructions executable by the processor to:
during a discovery interval, receive, through a first communication channel, a discovery message from a second mobile device, the discovery message indicating which particular post-discovery communication protocol for communicating within a mobile device cluster after the discovery interval is utilized for communicating within a mobile device cluster after the discovery interval, the discovery message indicating a time interval when the first mobile device is to receive association requests, wherein the discovery message indicates a second communication channel for receiving post-discovery communications from a second mobile device, wherein the second communication channel is different than the first communication channel;
in response to the discovery message and after the discovery interval, send a response to the second mobile device using the post-discovery communication protocol;
in response to receiving the discovery message, send a message to the second mobile device during the time interval, the message including a security information request and a paging request; and
receive one or more post-discovery communications from the second mobile device based on the security information request.

24. The apparatus of claim 23, wherein the plurality of post-discovery communication protocols comprises WiFi Direct, always-on association technique, and a public frame technique, and the indicated particular post-discovery communication protocol is WiFi Direct.

* * * * *